United States Patent Office 2,765,231
Patented Oct. 2, 1956

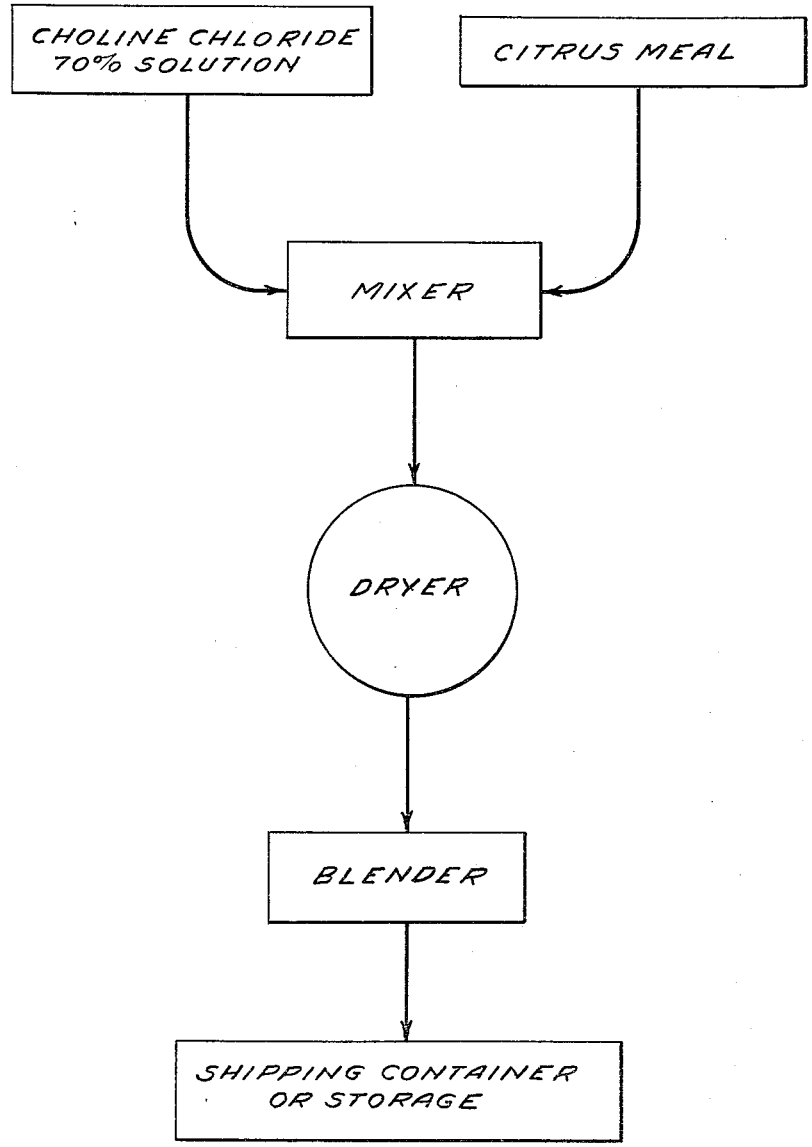

2,765,231

CITRUS MEAL CARRIER FOR HYGROSCOPIC VITAMINS

Jerome Edward Plitt, Pearl River, N. Y., assignor to American Cyanamid Company, New York, N. Y., a corporation of Maine Application May 3, 1952, Serial No. 285,840

7 Claims. (Cl. 99—2)

This invention relates to new compositions of matter and to methods of preparing the same.

In recent years the improvement of animal feeds by the addition of vitamins and growth factors thereto has increased greatly in importance both as to the extent of the practice and the variety of the supplements that are added to the animal feed. Some of the desired feed supplements are of such a nature that they are readily handled by merely mixing with the diet and present no particular problem. Others, however, are of a hygroscopic nature and cannot be readily mixed with the animal feed by ordinary methods with the equipment available to the feed mixer. Choline, for example, is an important nutritional substance that is desired in animal feeds. This vitamin is, however, in its ordinary forms extremely hydgroscopic and cannot be satisfactorily mixed. It has been added to the feed in the form of a 70% solution but this requires special mixing and drying equipment which is not ordinarily available to the feed producer. Various other vitamins such as niacin and pantothenic acid are also hygroscopic and are difficult to mix with animal feeds.

Efforts to market such products on various solid carriers such as calcium carbonate, ground walnut shells, soybean meal, hominy grits, distillers' grains and the like have not been satisfactory for various reasons, among these being the fact that they do not mask the odor of choline chloride which is not only hygroscopic but has a very obnoxious odor. I have found, unexpectedly, that a product known as citrus meal is especially effective as a carrier for hygroscopic vitamins for addition to animal feeds in that it is of a desirable physical form, will carry the hygroscopic vitamins successfully, and has very good odor-masking qualities for obnoxious smelling feed supplements. Not only that, but it is relatively cheap, available in unlimited quantities, and possesses some nutritional value of its own. Accordingly, I find that citrus meal is an ideal carrier for hygroscopic feed supplements when used in the manner described herein.

A further advantage of this invention is that it allows the uniform incorporation in animal feeds of extremely minute amounts of some of the more potent vitamins, such as vitamin B12. The desired quantity of vitamin B12 is only about 10 mg. per ton of feed and it will be obvious that the uniform distribution of this small quantity of material is exceedingly difficult except when using the process of the present invention.

A preferred manner of using citrus meal in practicing the invention may be illustrated by means of the drawing, the single sheet of which carries a flow sheet of a preferred procedure. By this process citrus meal, which will be described in greater detail hereinafter, is mixed with an aqueous solution of a hygroscopic nutrition factor, for example a 70% aqueous solution of choline chloride. The mixing may be done by merely spraying the solution on to a quantity of citrus meal in a container. In more elaborate installations (not shown), the mixer may be a rotating drum with baffles, and the mixing may be continuous as the citrus meal passes through to the drying stage of the operation.

Obviously, the solution containing the vitamin should be as concentrated as practical inasmuch as it is desired to avoid excess quantities of moisture in the final product and ordinarily the mixed material must be subjected to a drying operation. Except for this consideration, the concentration of the vitamin in the aqueous solution is not critical and may vary over a wide range.

The amount of vitamin added to the citrus meal at this point may also vary considerably. In the case of choline, the final dried product preferably carries from 10 to 35% by weight of the vitamin. When adding substances such as vitamin B12 to the citrus meal, there would be much less of the vitamin by weight in the final product by virtue of the exceedingly small quantities of this vitamin that are needed in the animals' diet. Accordingly, concentration is a matter of choice within the skill of the art.

When the quantity of liquid added to the citrus meal is substantial, it will be desirable to dry the mixed materials as shown in the flowsheet. The mixed citrus meal product is passed to a dryer, which may be any one of the numerous types such as a rotating drum, trays or the like. It is even possible to combine the mixing and drying into one operation, particularly where the operation is continuous, in which case the vitamin solution is added at one end of the dryer with the citrus meal, and the dried product removed at the other end. The desired moisture content of the final product is of the order of 2 to 10% by weight.

After drying, the product may be further ground, sifted or blended as shown in the flowsheet. Other substances that are desired in the feed may be added at this point if desired. After proper blending, the product may then be placed in containers for storage or shipping to the ultimate purchaser who may add the vitamin-bearing citrus product to his normal feeds in any manner or quantity desired.

Citrus meal as employed in the process is a commercial product which is a dried and ground mixture of citrus residues from oranges, lemons, grapefruits and the like remaining after extraction of the desirable juices and/or essential oils. It may be obtained in various grades. A preferred grade is one in which all of the meal will pass through a 40 mesh standard sieve. This eliminates large pieces of peel which may make the product unsuitable for blending into animal feeds. On the other hand, no more than about 15% of the material should pass through a 100 mesh sieve as extremely fine particles are not desirable.

The analysis of a typical citrus meal is as follows:

| | Percent |
|---|---|
| Moisture | 10.5 to 12.0 |
| Crude protein | 7.70 |
| Fibre | 7.81 |
| Nitrogen free extract | 66.96 |
| Fat | 1.68 |
| Ash | 3.35 |

The ash consists principally of calcium, but contains small amounts of potassium, magnesium, phosphorus, iron, copper, zinc, manganese, boron and other desirable trace elements.

It will be understood that several hygroscopic vitamins may be simultaneously sprayed on to the citrus meal and the product then dried for subsequent use. The solution may at the same time contain other substances which are desired in the final animal feed. The product as dried can then be mixed with various other components of the animals' diet such as ground corn, soybean meal, peanut meal, meat and fish meals, and various combinations of these substances as desired.

Although the process of the present invention is particularly advantageous as a means of incorporating choline into animal feeds, it is also of value as a means in incorporating other growth factors. Pantothenic acid and its salts are hygroscopic materials which may be advantageously handled by mixing with citrus meal in the manner described. Likewise, niacin and various other vitamins may be added in this manner. The process of the invention is also useful in that it makes it unnecessary to crystallize the vitamins from solution. For example, the reaction product of beta alanine, calcium hydroxide and d-l, alpha-hydroxy-beta, beta-dimethyl-gamma-butyrolactone which is d,l-calcium pantothenate may be added directly to the citrus meal from the reaction kettle without purification and isolation of the vitamin. Such a product may contain 10 to 35% by weight of calcium pantothenate. Similarly, crude solution containing riboflavin from fermentation processes may be incorporated in animal feeds by mixing the liquor with citrus meal in the manner herein described.

I claim:

1. A process which comprises the steps of treating citrus meal with an aqueous solution of a hygroscopic vitamin of the group consisting of choline and pantothenic acid and the hygroscopic salts of choline and pantothenic acid, and thereafter drying the product to within a moisture content of 2 to 10% by weight.

2. A composition of matter comprising dried citrus meal carrying 10 to 35% by weight of choline in the form of a hygroscopic salt thereof, said dried mixture having a moisture content of from 2 to 10% by weight.

3. A composition of matter comprising dried citrus meal and 10 to 35% by weight of calcium pantothenate, said dried mixture having a moisture content of from 2 to 10% by weight.

4. A process which comprises the steps of treating citrus meal with an aqueous solution of choline chloride and thereafter drying the product to within a moisture content of 2 to 10% by weight.

5. A process which comprises the steps of spraying on to citrus meal a 70% aqueous solution of choline chloride, drying the product to a moisture content within the range of about 2 to 10% by weight, blending the dried material, and thereafter mixing said product with animal feed.

6. A composition of matter comprising dried citrus meal carrying 10–35 percent by weight of a hygroscopic vitamin of the group consisting of choline and pantothenic acid and hygroscopic salts of choline and pantothenic acid, said dried mixture having a moisture content of from 2 to 10% by weight.

7. A composition of matter comprising dried citrus meal carrying 10–35 percent by weight of choline chloride, said dried mixture having a moisture content of from 2 to 10% by weight.

References Cited in the file of this patent

UNITED STATES PATENTS

| | | |
|---|---|---|
| 2,126,947 | Cocke | Aug. 16, 1938 |
| 2,302,927 | Whitmoyer et al. | Nov. 24, 1942 |
| 2,302,928 | Whitmoyer et al. | Nov. 24, 1942 |
| 2,496,634 | Melnick | Feb. 7, 1950 |
| 2,576,644 | Schmitz | Nov. 27, 1951 |